Jan. 3, 1956    H. N. SWIM, JR    2,729,513
DOOR CONSTRUCTION FOR COTTON PICKER
Filed Dec. 9, 1954    3 Sheets-Sheet 1
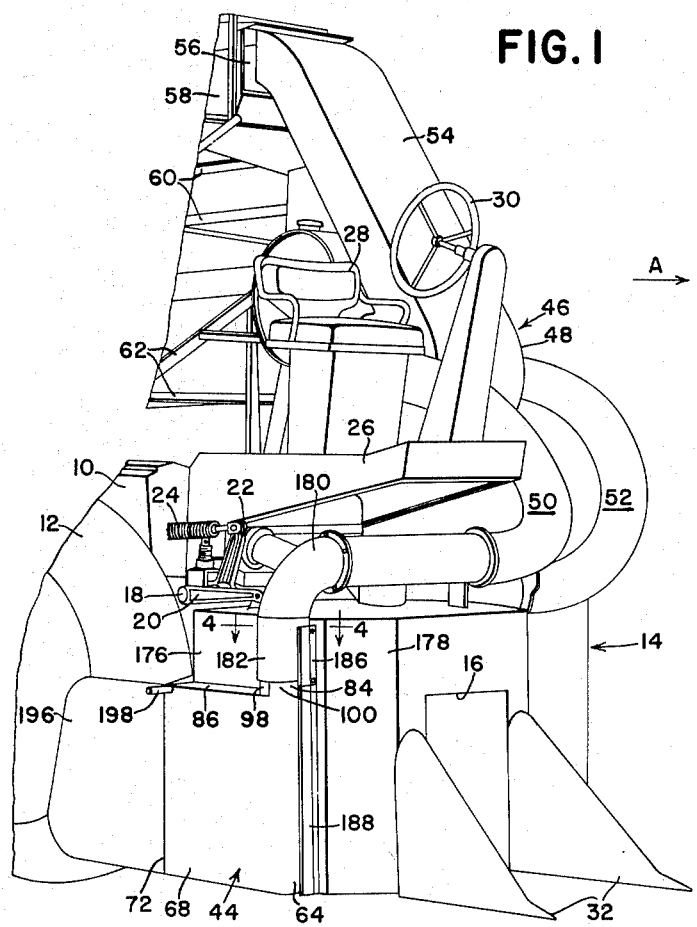
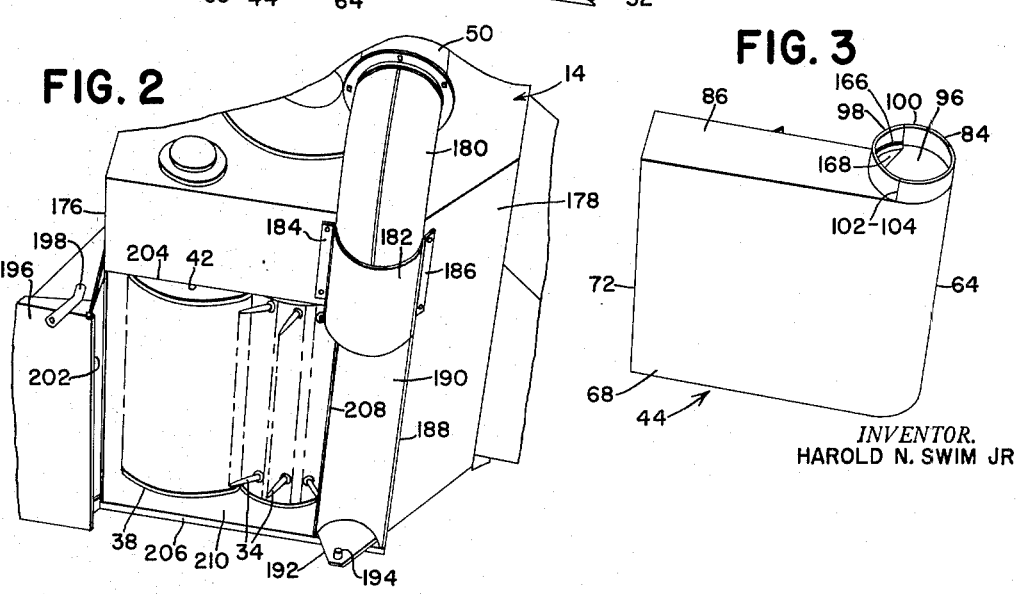
INVENTOR.
HAROLD N. SWIM JR.

Jan. 3, 1956  H. N. SWIM, JR  2,729,513
DOOR CONSTRUCTION FOR COTTON PICKER
Filed Dec. 9, 1954  3 Sheets-Sheet 2

INVENTOR.
HAROLD N. SWIM JR.

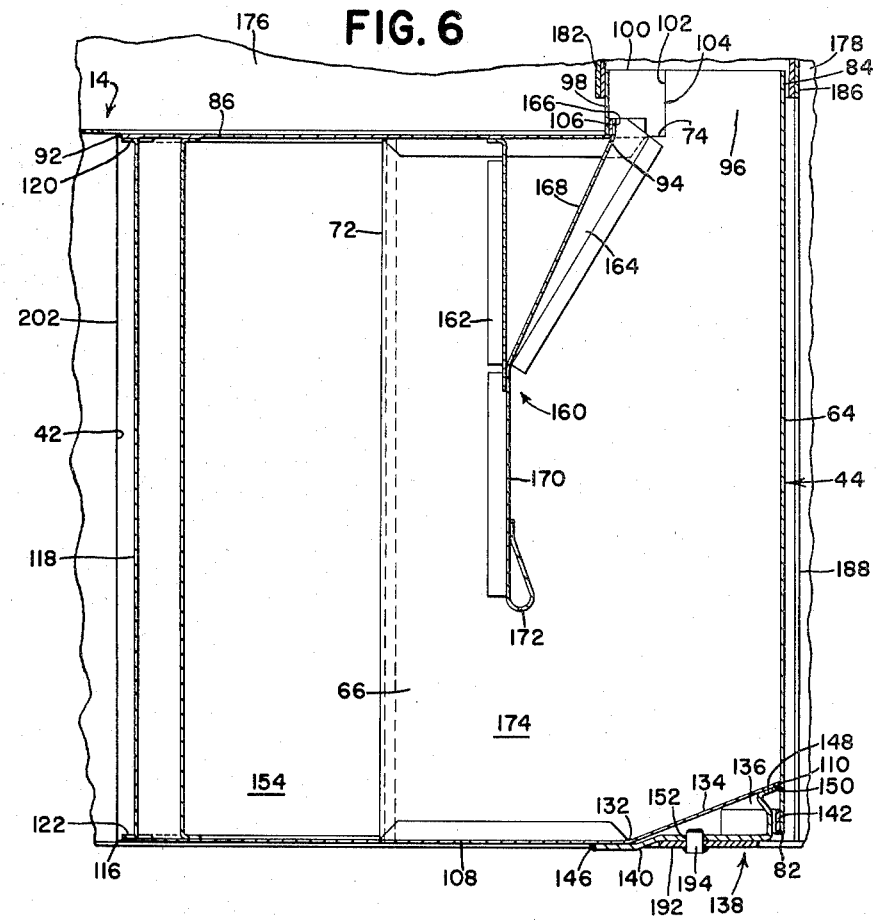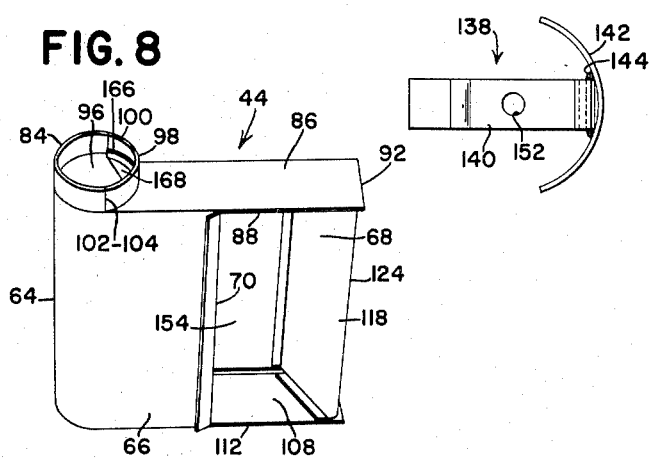

United States Patent Office 2,729,513
Patented Jan. 3, 1956

2,729,513

DOOR CONSTRUCTION FOR COTTON PICKER

Harold N. Swim, Jr., Des Moines, Iowa, assignor to Deere Manufacturing Co., Dubuque, Iowa, a corporation of Iowa Application December 9, 1954, Serial No. 474,152

8 Claims. (Cl. 302—58)

This invention relates to a door construction and preferably to a simple and inexpensive sheet metal door finding principal utility in connection with the picking and doffing mechanism of a cotton picker.

A representative cotton picker of the general class referred to is disclosed in the U. S. patent to Paradise 2,660,852, wherein it will be seen that the picking machine operates over a field in which the cotton is planted in rows, the machine having one or more picking units for picking from one or more rows. Each picking unit includes picking spindles that are barbed and rotate to pull the cotton from the ripened bolls as the machine advances, the spindles being arranged in a drum which rotates as a unit to carry the spindles through the plants and then back through doffing mechanism from which the cotton is doffed for ultimate transfer to a basket or receptacle by pneumatic conveying means. The basket is relatively remote from the doffing mechanism and the pneumatic conveying means includes a cotton and air inlet adjacent to the doffing means so that the doffed cotton may be transferred to the conveying means. It is conventional practice to provide the cotton and air inlet in the form of a door that encloses the picking unit at the side thereof to which the doffing mechanism is adjacent, the door having an imperforate outer panel and an inner panel provided with the inlet opening. The door is hinged so that access may be had to the picking mechanism.

According to the present invention, it is a feature to provide an improved door of the general character noted, this feature and subsidiary features residing in the particular construction of the door in the form of relatively few one-piece sections integrally joined to afford a unitary lightweight door. The inner and outer panels of the door are formed from a one-piece sheet bent back upon itself to provide an upright front wall of semi-circular section and a pair of rearwardly extending panels, the inner panel being shorter in rearward length than the outer and the top and bottom edges of the panels being respectively closed by top and bottom plates and the rear edges of the outer panel and of the top and bottom plates being joined by a rear wall, the difference in length between the panels affording the inlet opening. The invention further features the provision of conduit means communicating with the interior of the hollow door, the conduit means being afforded by the provision of a semicircular coaxial extension of the upright front wall and appropriate half-ring sections joined thereto and completing the circular conduit portion.

The foregoing and other important objects inherent in and encompassed by the invention will become apparent as a preferred embodiment of the invention is disclosed in detail in the ensuing specification and accompanying sheets of drawings, the several figures of which are described immediately below.

Fig. 1 is a perspective view of the front portion of a representative type of cotton picker.

Fig. 2 is a fragmentary perspective view, on a somewhat enlarged scale over that of Fig. 1, showing the involved picker-housing structure with the door removed.

Fig. 3 is a perspective view of the door as removed from the structure of Fig. 2.

Fig. 6 is an upright sectional view as seen along the line 6—6 of Fig. 4.

Fig. 7 is a detail view of the lower pivot mounting for the door.

Fig. 8 is a perspective view of the door as seen from the side opposite to that shown in Fig. 3.

Figure 4:
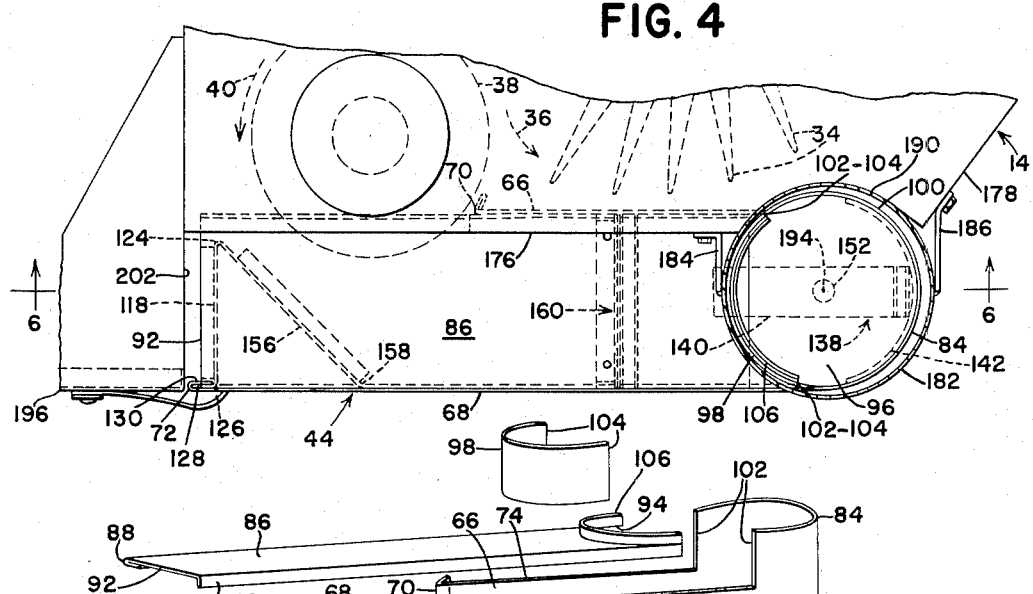
Fig. 4 is a fragmentary plan view, on an enlarged scale, and partly in section as seen somewhat along the line 4—4 of Fig. 1.

The picking machine chosen for the purposes of illustration comprises a supporting frame or body 10 carried for advance over a field in the direction of the arrow A by appropriate ground-engaging wheels, a portion of one of which is visible at 12. The frame or body carries forwardly thereof a picking mechanism housing 14 having a fore-and-aft extending picking passageway or throat 16 in which the row-planted cotton is received as the machine advances. The supporting structure for the picker housing 14 may be of any nature, that shown comprising a transverse rockshaft 18 mounted on the body 10 and including one or more housing-supporting arms, such as that shown at 20, plus at least one upright arm 22 to which is connected a counterbalancing spring 24. These details are largely immaterial but are disclosed merely for the purposes of orientation.

The body 10 carries a forwardly positioned operator's platform 26 on which are supported a seat 28 and a steering wheel 30 for guiding the machine. Cotton plants are guided into the throat or passageway 16 by dividers or plant lifters 32. Here again, the structure is only representative of conventional design.

Cotton entering the picker housing 14 via the throat 16 is removed from the plants by picking mechanism of the type shown in the above-mentioned Paradise patent. As seen there, and as is familiar to those versed in the art, such picking mechanisms include a plurality of barbed spindles, a few of which are shown in Fig. 4 at 34. The portion of the housing 14 shown in Fig. 4 does not include the picker throat 16 but is spaced rightwardly therefrom. The drum (not shown) on which the spindles 34 are carried rotates in the direction of the arrow 36 and, after passing through the picking zone in the throat 16, passes through a doffing zone, as shown in Fig. 4, the doffing zone involving rotating doffer means 38 mounted for rotation in the direction of the arrow 40. See also Fig. 2, in which the general arrangement of the spindles 34 and doffing means 38 may be seen as exposed through a rectangular opening 42 at the right-hand side of the picker housing 14. Here, as elsewhere, the expressions "right" and "left" are used with reference to the position of an observer standing behind the machine and facing forwardly.

The picker-housing opening 42 is normally closed by a door, designated in its entirety by the numeral 44, and this door, as will be explained in detail below, is hollow and provides a cotton and air inlet for a pneumatic conveying system designated generally by the numeral 46. This system comprises a fan housing 48 within which is a rotary fan (not shown). The inlet to the fan housing 48 is established by a pair of flexible conduits 50 and 52, the conduit 50 leading to the door 44 and the conduit 52 leading to another intake (not shown). The fan housing 48 has a discharge or outlet 54 that is directed through an opening 56 in the front part of a receptacle or basket 58 mounted on the body 10. The numeral 60 designates parts of the basket or receptacle framework and the numeral 62 designates parts of the supporting structure for the basket. The operation of the machine consists, in general, of the performance of the picking operation, as detailed above, the removal of the picked cotton from the spindles 34 by the doffing means 38, the discharge of the doffed cotton into the hollow door 44 and the transfer of that cotton from the door to the basket 58 by the conveying system 46.

The door or door structure 44 comprises a rigid sheet having the shape of a U as viewed from above and of such configuration and arrangement that the bight of the U provides an upright front wall 64 of semicircular section about an upright axis and the legs of the U respectively provide inner and outer upright panels 66 and 68 integral with and extending rearwardly from the semicircular front wall 64. The inner panel 66 has an upright rear terminal edge 70 and the outer panel 68 has an upright rear terminal edge 72. The panels are substantially parallel and spaced apart transversely on the order of the diameter of the front wall, respectively having horizontally coplanar top edges 74 and 76 and horizontally coplanar bottom edges 78 and 80.

The outer panel is longer than the inner panel in fore-and-aft dimension to dispose its rear edge 72 rearwardly beyond the rear edge 70 of the inner panel. The upright semicircular or arcuate front wall has an arcuate or semicircular bottom edge 82 in the transverse horizontal plane of the bottom edges 78 and 80 of the panels 66 and 68. The front wall further has an upright integral coaxial semicircular extension 84 which rises above the plane of the top edges 74 and 76 of the panels.

The top of the door 44 is closed, with an exception to be hereinafter noted, by a top plate 86, which plate is substantially equal in length to the outer panel 68 and has inner and outer fore-and-aft edge portions 88 and 90, respectively, secured respectively to the panel top edges 74 and 76. The top plate further has a rear edge 92 transverse to the outer panel at the junction of the top and rear edges 76 and 72 of the outer panel. The top plate further has a semicircular front edge 94 that complements the front wall extension 84 and forms with that extension a circular top opening 96 in the plane of the top edges of the panels and communicating with the interior of the hollow door. An upright half-ring 98 is formed on or otherwise integrally united with the semicircular front edge 94 of the top plate 86 and combines with the front wall extension 84 to provide or afford an upright circular conduit 100 coaxially in communication with the top opening 96. The junctions of the portions 84 and 98 are accomplished along upright edges 102 on the portion 84 and 104 on the portion 98. To further increase the strength of the door in the zone just described, the front edge 94 of the top plate 86 has an upstanding semicircular flange 106 that closely fits within the half-ring 98. Integrating of the two may be accomplished by any suitable means, preferably by spot-welding.

A bottom plate 108 has a semicircular front edge 110 coincident with and secured to the lower portion of the front wall 64 adjacent to the arcuate or semicircular bottom edge 82 thereof. The bottom plate further has inner and outer fore-and-aft edge portions 112 and 114, respectively, secured respectively to the bottom edges 78 and 80 of the inner and outer panels 66 and 68. The bottom plate terminates in or has a transverse rear edge 116 in vertical alinement with the rear edge 92 of the top plate 86.

The door is closed at its rear by a transverse upright rear wall 118 which has top and bottom and inner and outer edges 120, 122, 124 and 126, respectively. The rear wall top and bottom edges are secured respectively to the rear edges of the top and bottom plates 86 and 108, again spot-welding being the preferred method of union. The outer edge 126 of the rear plate or wall 118 is integrally joined with the rear edge 72 of the outer panel 68. The edge 126 may be flanged as shown at 128 and the edge 72 may be folded forwardly, as at 130, so that the two interfit to provide a relatively air-tight joint. The top and bottom plates 86 and 108 are appropriately flanged for obvious purposes and are deemed to require no further description in this respect.

Figure 5:
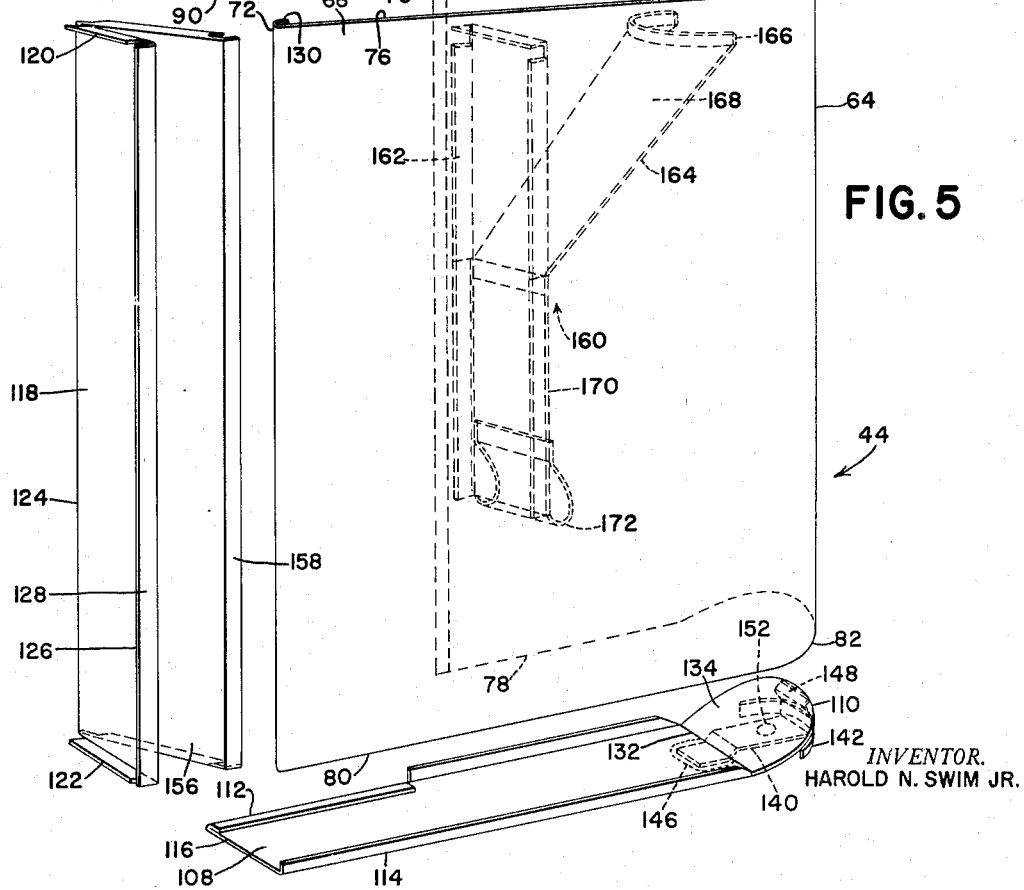
Fig. 5 is an exploded view of the door, showing the various components thereof.

As best shown in Figs. 5 and 6, the bottom plate 108 has therein a transverse bend line 132 from which a forward portion extends upwardly and forwardly, this being the portion that has thereon the semicircular edge 110 that interfits with the lower part of the upright front wall 64. The upward offset of the bottom plate front portion 134 affords a space 136 in which is mounted pivot means, designated generally by the numeral 138 and shown by itself in Fig. 7, coaxial with the conduit 100 and combining with the conduit for the hinged or pivotal mounting of the door on the picker housing 14, regarding which more will appear below. The pivot means comprises essentially a fore-and-aft strap 140 and an arcuate strap 142, the two being joined as by welding at 144. The arcuate strap 142 may be spot-welded to the lower portion of the wall 64 adjacent to the semicircular bottom edge 82 and the fore-and-aft strap may be welded at its rear end, as at 146, to the underside of the bottom plate 108. The forward portion of the strap is angled upwardly and flanged at 148 for welding at 150 to the bottom plate portion 134 (Fig. 6). A circular aperture 152 is provided in the fore-and-aft strap 140, this aperture serving as a bearing for the hinge mounting of the door, as will subsequently appear.

As best seen in Fig. 8, the inner edge 124 of the rear wall 118 is spaced rearwardly from the rear edge 70 of the inner panel 66 and these two edges, in conjunction with the inner edge portions of the top and bottom plates that exceed the length of the inner panel 66, provide or define a rectangular inner side opening 154, which opening, as best seen in Fig. 4, is in alinement with the doffer means 38 and thus affords an inlet for cotton thrown off by the doffer as the doffer rotates in the direction of the arrow 40.

As an integral part of the rear wall 118, there is provided an upright deflector 156 which is directed forwardly and outwardly from the inner edge 124 of the rear wall, the deflector having an upright outer edge 158 flanged for union with the inner surface of the outer panel 68. This deflector serves to direct the doffed cotton forwardly and within the hollow door 44.

The interior of the door includes partition means, designated generally by the numeral 160 and including an upright partition member or baffle 162 and a forwardly and upwardly inclined transition member 164. The transition member has an upper semicircular edge having thereon an upstanding flange 166 which nests within the flange 106 on the forward edge of the top plate 86. The transition member extends downwardly and rearwardly, as at 168, and includes integrally therewith a depending lower portion 170 which terminates in a lower loop-like appendage or part 172, the axis of the loop-like structure being transversely between the inner and outer panels 66 and 68. The parts 168 and 170 are appropriately flanged as indicated to facilitate union of the parts with the inner and outer panels, as by spot-welding or any other suitable means, the details of which are deemed unnecessary to the disclosure. The depending part 170 is substantially coplanar with the partition or baffle 162 and the two could be formed integrally with the transition member 164 as a separate component. The baffle 162 prevents the accumulation of cotton on the top of the transition member 164, which accumulation is likely to occur were the baffle 162 omitted. The loop-like appendage 172 affords rigidity at the bottom of the part 170 and at the same time provides a smooth contour and eliminates sharp projecting edges in the passage of cotton between said lower portion and the bottom plate 108 as the cotton moves through the inlet opening 154 to the conduit 100. Additional rigidity at the conduit 100 is afforded by nesting of the flange 166 with the flange 106 which in turn is embraced by the half-ring 98, previously described. The passageway between the bottom plate 108 and the lower terminal edge or loop-like portion 172 is designated generally by the numeral 174.

The picker housing 14 includes, among other things, a right-hand side wall 176 and a front wall 178 that inclines forwardly and to the left. An elbow 180 is joined to the conduit 150 and is turned downwardly substantially at the corner or junction formed by the intersection of the picker-housing wall portions 176 and 178. The elbow includes a lower circular portion 182 of sufficient diameter to loosely accommodate the upper conduit 100 formed on the top of the door (Fig. 4). This portion of the elbow is rigidly mounted on the picker-housing walls 176 and 178 by angled straps 184 and 186. The front angled strap 186 is extended downwardly, as best seen at 188 in Figs. 1 and 2, to afford a front seal for the joint between the door and the picker housing 14.

The junction of the picker-housing wall parts 176 and 178 provides a concave upright recess 190 which at its upper portion accommodates the elbow extension 182 and which at its lower portion accommodates the inner arcuate section of the front part of the door 44. Coaxially disposed with the elbow extension 182 is a lower bracket 192 on which is an upstanding pivot pin 194. When the door is mounted on the picker housing, the upper conduit 100 is received loosely within the elbow extension 182 and the pivot means 138, by means of the opening 152 therein, is received by the pivot pin 194 on the bracket 192. Thus, the door is hingedly mounted on the picker housing for movement between open and closed positions relative to the picker-housing side opening 42. A rearwardly extending wheel shield 196, rigid on the picker housing and offset to the right from the picker-housing wall part 176, carries a pivoted latch 198 which is selectively positionable to lock or release the door 44, as will be best seen by a comparison of Figs. 1 and 2.

The lateral offset between the wheel shield 196 and the picker-housing right-hand wall part 176 is designated by the numeral 202. This offset, in conjunction with upper and lower edges 204 and 206 of top and bottom parts of the picker housing 14 define the rear, top and bottom edges of the picker-housing side opening 42, the forward edge of the opening being defined, as at 208, by the upright rear edge of the concave upright recess 190, it being understood that the upper edge 204 is the bottom edge of the picker-housing right-hand side wall 176 and the lower edge 206 is the outer edge of a floor 210 in the picker housing. The vertical dimension of the door is such that, when it is closed, as shown in Fig. 4, the upper and lower marginal portions thereof are received within the upper and lower edges 204 and 206 of the opening 42. That is to say, the upper side wall portion 176 and the outer edge 206 of the picker-housing floor 210 lap the top and bottom of the door. Hence, when the door is closed, it is incapable of undesirable vertical movement relative to the housing. However, when the door is opened, the top edge thereof is clear of the top edge 204 of the picker-housing wall 176 and the clearance between the top of the door and the under edge of the elbow extension 182 (Fig. 6) is such that the door may be lifted high enough to clear the pivot means 138 from the pivot pin 194 in the lower bracket 192. Thus, the door may be readily removed. It may be mounted by reversing the procedure just described. Therefore, the hinge means is accomplished solely by the elbow extension 182 and the coaxial pivot means 138. The lower extension 188 of the front angled strap 186 affords a dirt seal for the junction between the door and the picker housing 14.

Although, as appears in Figs. 4 and 6, there is a slight degree of eccentricity between the door conduit 100 and the elbow extension 182, the slight space is not enough to cause such an air loss as would interfere with the operation of the pneumatic conveying system.

Another thing that should be noted is the apparent misplacement of the transition means 160 in Fig. 5. However, it is to be understood that this is an exploded view and the transition means 160 is downwardly and rearwardly of its true or ultimate position, which position is shown best in Fig. 6.

Various features of the invention not categorically enumerated will undoubtedly occur to those versed in the art, as will many modifications and alterations in the preferred embodiment illustrated, all of which may be achieved without departing from the spirit and scope of the invention.

What is claimed is:

1. A door structure of the character described, comprising: a rigid sheet having the shape of a U and of such configuration and arrangement that the bight of the U provides an upright front wall of semi-circular section about an upright axis and the legs of the U respectively provide inner and outer upright panels integral with and extending rearwardly from the front wall to respective upright rear terminal edges, said panels being substantially parallel and spaced apart transversely on the order of the diameter of the front wall and having horizontally coplanar top edges and horizontally coplanar bottom edges, the outer panel being longer than the inner panel in fore-and-aft dimension to dispose its rear edge rearwardly beyond the rear edge of the inner panel, and said front wall having an arcuate bottom edge in the plane of the bottom edges of the panels and said front wall further having an upright, integral, coaxial semi-circular extension rising above the plane of the top edges of the panel; a top plate substantially equal in length to the outer panel and having inner and outer fore-and-aft edge portions secured respectively to the panel top edges and further having a rear edge transverse to the outer panel at the junction of the top and rear edges of said outer panel, said top plate having a semicircular front edge complementing the front wall extension and forming therewith a circular top opening in the plane of the top edges of the panels; an upright half-ring coincident with the semicircular front edge of the top plate and secured thereto, said half-ring being further secured to and combining with the front wall extension to provide an upright circular conduit coaxially in communication with the aforesaid top opening; a bottom plate having a semicircular front edge coincident with and secured to the front wall adjacent to the bottom edge thereof and further having inner and outer fore-and-aft edge portions secured respectively to the bottom edges of the panels, said bottom plate having a transverse rear edge in vertical alinement with the rear edge of the top plate; and an upright rear wall having top and bottom edges secured respectively to the rear edges of the top and bottom plates and an upright outer edge secured to the rear edge of the outer panel, said rear wall having an upright inner edge spaced rearwardly from the upright rear edge of the inner panel to provide, with said inner panel rear edge and the inner edge portions of the top and bottom plates that exceed the length of the inner panel, a rectangular inner side opening in the door structure.

2. The invention defined in claim 1, including: a transverse upright partition having a top edge secured to the top plate intermediate the conduit and the inner side opening, said partition depending from the top plate and cross-connecting the inner and outer panels and having a lower terminal edge portion spaced above the bottom plate to afford a passage via which the inner side opening and the conduit are in communication.

3. The invention defined in claim 2, in which: the lower terminal edge portion of the partition comprises an integral part of the partition having a loop-like shape on an axis transverse to the panels.

4. The invention defined in claim 2, including: a transition member having a semicircular upper edge coincident with the semicircular front edge of the top plate, said transition member further having a depending plate-like part cross-connecting the panels and inclining downwardly and rearwardly to a lower edge adjoining the partition.

5. The invention defined in claim 4, in which: the semicircular upper edge of the transition member has thereon an upstanding semicircular flange portion closely fitting the aforesaid half-ring on the top plate.

6. The invention defined in claim 1, including: upright pivot means carried by the bottom plate coaxial with the conduit.

7. The invention defined in claim 1, including: a transition member having a semicircular upper edge coincident with the semicircular front edge of the top plate, said transition member further having a depending plate-like part cross-connecting the panels and inclining downwardly and rearwardly to a lower edge spaced above the bottom plate to afford a passage via which the inner side opening and the conduit are in communication.

8. A door structure of the character described, comprising: a rigid sheet having the shape of a U and of such configuration and arrangement that the bight of the U provides an upright front wall of semicircular section about an upright axis and the legs of the U respectively provide inner and outer upright panels integral with and extending rearwardly from the front wall to respective upright rear terminal edges, said panels being substantially parallel and spaced apart transversely on the order of the diameter of the front wall and having horizontally coplanar top edges and horizontally coplanar bottom edges, the outer panel being longer than the inner panel in fore-and-aft dimension to dispose its rear edge rearwardly beyond the rear edge of the inner panel, and said front wall having an arcuate bottom edge in the plane of the bottom edges of the panels and said front wall further having an upright, integral circular extension affording a conduit rising above the plane of the top edges of the panel and communicating with the interior of the door; a top plate substantially equal in length to the outer panel and having inner and outer fore-and-aft edge portions secured respectively to the panel top edges and further having a rear edge transverse to the outer panel at the junction of the top and rear edges of said outer panel, said top plate having a semicircular front edge complementing the front wall extension; a bottom plate having a semi-circular front edge coincident with and secured to the bottom edge of the front wall and further having inner and outer fore-and-aft edge portions secured respectively to the bottom edges of the panels, said bottom plate having a transverse rear edge in vertical alinement with the rear edge of the top plate, said bottom plate having a forward portion offset upwardly from the plane of the bottom edges of the panels and front wall to afford a downwardly opening pocket in vertical alinement with the conduit; pivot means carried by the door in the pocket and coaxial with the conduit to combine with the conduit as a mounting hinge for the door; and an upright rear wall having top and bottom edges secured respectively to the rear edges of the top and bottom plates and an upright outer edge secured to the rear edge of the outer panel, said rear wall having an upright inner edge spaced rearwardly from the upright rear edge of the inner panel to provide, with said inner panel rear edge and the inner edge portions of the top and bottom plates that exceed the length of the inner panel, a rectangular inner side opening in the door structure.

No references cited.